United States Patent [19]
Rosenthal

[11] Patent Number: 5,359,659
[45] Date of Patent: Oct. 25, 1994

[54] METHOD FOR SECURING SOFTWARE AGAINST CORRUPTION BY COMPUTER VIRUSES

[76] Inventor: Doren Rosenthal, 3737 Sequoia Dr., San Luis Obispo, Calif. 93401

[21] Appl. No.: 901,552

[22] Filed: Jun. 19, 1992

[51] Int. Cl.$^5$ .............................................. H04L 9/00
[52] U.S. Cl. ........................................................ 380/4
[58] Field of Search ..................... 380/4; 364/269.4; 395/575, 700

[56] References Cited

U.S. PATENT DOCUMENTS

| | | | |
|---|---|---|---|
| 4,975,950 | 12/1990 | Lentz | 380/4 |
| 5,121,345 | 6/1992 | Lenta | 380/4 |
| 5,144,660 | 9/1992 | Rose | 380/4 |
| 5,274,819 | 12/1993 | Bloomfield-Brown | 395/700 |
| 5,278,901 | 1/1994 | Shieh et al. | 380/4 |
| 5,289,540 | 2/1994 | Jones | 380/4 |

OTHER PUBLICATIONS

Gatekeeper Aid 1.0.1 (1989) Johnson (p. 1).
Taylor, W., "Virus-Proof Your PC," *PC Computing*, Feb. 1992, pp. 124–137.
Diehl, S., et al, "Rx For Safer Data" *Byte*, Aug. 1991, pp. 218–235 and specifically pp. 226–228.
Salamone, S., "Good Virus Protection Becomes Cheap, Test Shows," *Network World*, vol. 8, No. 42, Oct. 21, 1991, pp. 1, 68–69.
Ellison, C., "On Guard: 20 Utilities That Battle The Virus Threat," *PC Magazine*, Oct. 29, 1991, pp. 200–280.
Burger, R., *Computer Viruses, A High-Tech Disease*, (Abacus, Apr. 1989), pp. 87–91, 231–252.
Lundell, A., *Virus! The Secret World of Computer invaders That Breed and Destroy*, (Contemporary Book, 1989), pp. 170–175.
Roberts, R., *Computer Viruses*, (Compute! Publications, 1988), pp. 31–79, 95–144.
McAfee, J., *Computer Viruses, Worms, Data Diddlers, Killer Programs, and Other Threats To Your System*, (St. Martin's Press, 1989), pp. 139–172.

*Primary Examiner*—Salvatore Cangialosi
*Attorney, Agent, or Firm*—Irell & Manella

[57] ABSTRACT

A method is disclosed for securing an existing executable software program against infection or corruption by software viruses or the like, without requiring any modification to the program's source code or any recompilation or relinking. Security routines capable of detecting the presence of any virus infection or other corruption are coupled to the program. The loading information for the program is modified so that upon any attempt to execute the program, the security routines will execute first and scan for viruses or other corruption. If any viruses or corruption are detected, execution of the program is aborted and a warning is displayed. If no viruses or corruption are found, the security routines are removed from memory and execution of the program continues normally.

30 Claims, 8 Drawing Sheets

METHOD FOR SECURING SOFTWARE AGAINST CORRUPTION BY COMPUTER VIRUSES

FIELD OF THE INVENTION

This invention relates to computer system security, and more specifically a method and apparatus to enhance the security and integrity of computer programs against corruption by software viruses or other means.

BACKGROUND OF THE INVENTION

A software or computer "virus" (sometimes also known as a worm or trojan) is a special piece of program code, usually created by a malicious programmer, that exists within ("infects") an otherwise normal computer program. When an infected program is run, the viral code seeks out other programs within the computer and replicates itself. Infected programs can be anywhere in the system or even the operating system itself, and if undetected can have devastating effects, such as interfering with system operations or destruction of data.

It is difficult for producers of computer software to design and produce products that are adequately secure against infection by such software viruses. The invention disclosed herein provides a method to "harden" or treat existing computer software programs such that the programs protect themselves against possible corruption, including corruption through infection or other modification by software viruses.

A number of methods have been devised that address the detection and prevention of infection by viruses. One approach is to use a separate program, external to the application programs being examined, to search through ("scan") a computer's memory and disk storage for the characteristic pattern ("signature") of a known virus. Examples of products implementing this technique include Virex from MicroCom, Inc. (Durham, N.C.) and Viruscan from MacAfee Associates (Santa Clara, Calif.). The effectiveness of this approach is limited, however, by the fact that it depends on the computer user manually invoking the scanning software from time to time to scan the system. Computer users often fail to run such scans with sufficient frequency to prevent a virus from spreading during the "incubation" period between scans. Moreover, such scans often require users to wait an unacceptable period of time while the entire system is scanned.

Another method to detect alteration of a program involves calculating a checksum value for the program being examined, and comparing it to the known checksum value of the original, pristine version of the program. If the program being examined has been infected by a computer virus or otherwise altered, the checksum value of the program will have changed as well. Examples of products implementing this method include Norton AntiVirus from Symantec Corp. (Cupertino, Calif.), and System Monitor from Rosenthal Engineering (San Luis Obispo, Calif.). This approach suffers from similar limitations, in that it requires that the user remember to invoke the checksum software each time before running any of the user's programs, and that the user remember to have a checksum calculated and stored for any new program when it is installed.

Finally, some prior art application programs embody one or more of the foregoing methods as a built-in function. Examples of such products include Virus Simulator from Rosenthal Engineering (San Luis Obispo, Calif.), and Turbo Debugger from Borland International, Inc. (Scotts Valley, Calif.). Such an approach, however, requires that additional costly effort be expended in the original design of the application program source code to incorporate these functions; further, software programs protected according to this approach will not be able to detect later-created viruses without replacing the entire application program with a new version. Unlike the present invention, the prior art has never been able to secure existing executable application programs by directly coupling security routines to such program.

SUMMARY OF THE INVENTION

It is therefore an object of the present invention to provide a method to enhance the security of computer software, and reduce the software's susceptibility to corruption and an apparatus capable of carrying out that method. Another object of this invention is to verify the integrity of a computer program at the time it is executed. Yet another object is to allow producers of software to protect the integrity of their customers' computer systems by insuring that the products they distribute remain free of malicious contamination. These and other objects of the present invention are realized in the method described that enhances the security of an existing program by hardening the program such that the hardened version of the program automatically will detect infection by software viruses or any other unauthorized modification, tampering or alteration (collectively "corruption").

No modification to the original source code of the program to be protected, nor any recompilation or relinking, is required. Instead, the invention takes an existing, executable (object code) version of the program to be protected, and modifies that executable program code to produce a protected version of the program that is functionally equivalent to the original executable version, but that incorporates added security routines and protection. A preferred embodiment of the present invention also adds a formidable defense against unauthorized tampering, by compressing and encrypting the protected program, rendering the program much more difficult to disassemble or infect.

When a program that has been protected by the method of the present invention is executed, the incorporated security routines execute first and automatically check for any corruption of the protected program. If no corruption is detected, the protected program is decompressed and decrypted, loaded into memory in its original form, and executed as normal. These security precautions are entirely automatic and take only a few seconds.

Thus, the protection provided by this invention is completely transparent to the end user, except that a program protected by this method will display a warning when executed if any corruption is detected, and optionally may, whenever executed, display an announcement of the fact that it has been protected by the method of the present invention, thus helping prevent the further contamination of any other software.

This enhanced protection adds very little to a program's normal loading time, and has no effect on run time performance, as the original executable program code is restored in memory. Disk storage space for the protected program often will be less than for the original program (particularly for larger programs), because the program is compressed. Memory requirements for execution of a protected program are virtually the same as without protection, because after the security routines are run, virtually all memory space used for the security routines is released for reuse.

This invention offers a number of advantages over currently employed anti-virus methods. The protection offered by this invention is relatively transparent to the user, and is extremely fast because it only needs to examine those programs in use as opposed to everything on a system or network. Moreover, unlike current anti-virus methods, protection is active each time a protected program is run, without any need for operator or user intervention. The invention thus eliminates the "incubation" period between the time an infected program is run (and begins infecting other programs) and the time a user or system administrator gets around (if ever) to running the next security check. Thus, when an infection is discovered using the method of this invention, it will usually be early enough to prevent further contamination, and even to reveal the first generation source of the infection.

DETAILED DESCRIPTION OF THE PREFERRED EMBODIMENT

Figure 1:
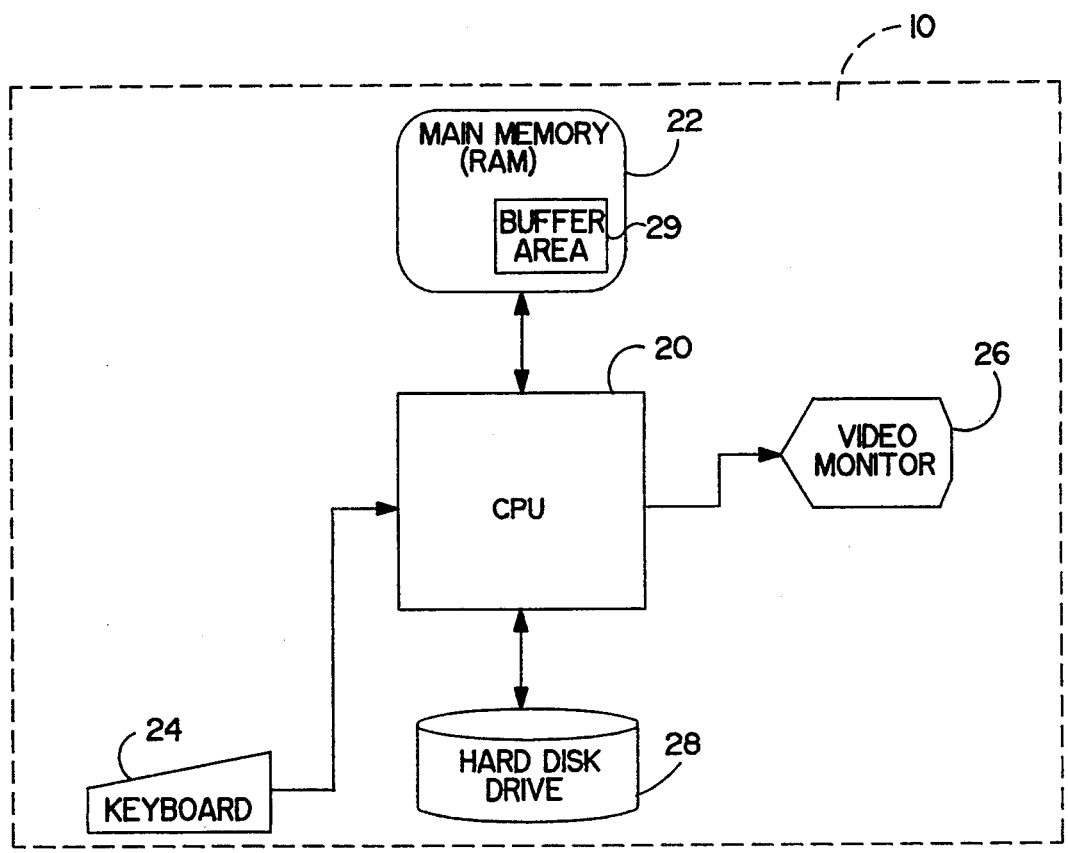
FIG. 1—A schematic representation of a computer system for implementation of the preferred embodiment.

The present invention utilizes a computer system 10 of conventional design, shown in schematic form in FIG. 1, having a CPU unit 20, random access main memory 22 (RAM), one or more input devices, preferably including a keyboard 24, one or more output devices, preferably including a video display monitor 26, and one or more mass storage devices, preferably including a fixed hard disk drive 28. Included within main memory 22 is a buffer area 29, which is discussed further below.

The preferred embodiment of the present invention herein described is implemented on a computer compatible with the "IBM-PC®" (a trademark of International Business Machines) family of computers running the "PC-DOS" or "MS-DOS" operating systems (trademarks of IBM and Microsoft Corporation, respectively). However, it will be apparent to those skilled in the art that the present invention is equally applicable to other types of computers (e.g., the Apple Macintosh®) and operating systems (e.g., Microsoft Windows®, UNIX® or IBM OS/2®). Accordingly, the following illustrative description, insofar as it relates to specific requirements of the PC-DOS/MS-DOS systems, is not intended to limit applicant's invention.

Figure 2:
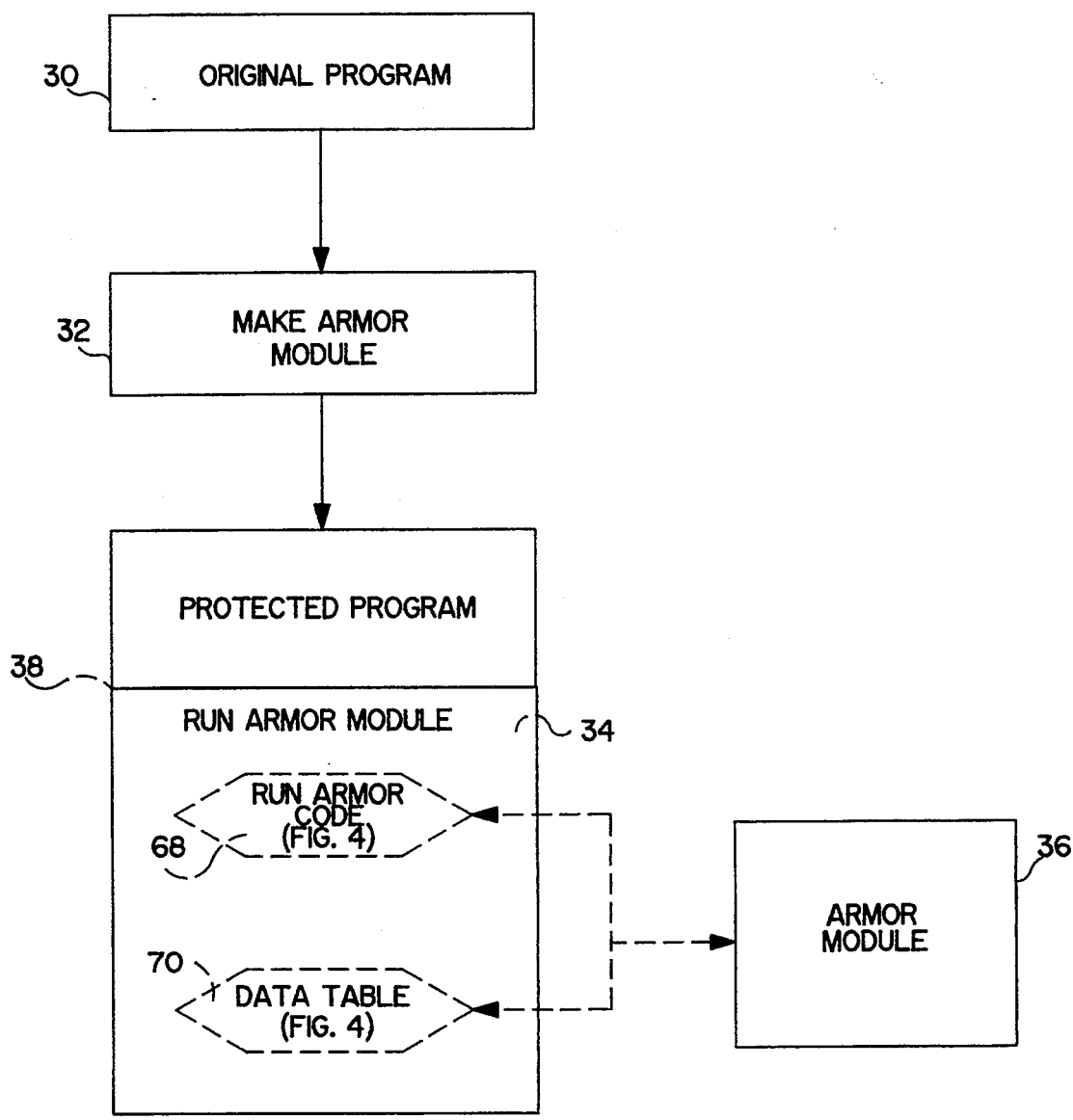
FIG. 2—A depiction of the overall structure of the preferred embodiment.

Referring to FIG. 2, original program 30 is an otherwise normal application or systems program, stored on hard disk drive 28 (FIG. 1), that the user desires to secure. The preferred embodiment of this invention utilizes three principal modules for security enhancement: Make Armor 32, Run Armor 34 (comprised of Run Armor code 68 and data table 70), and Armor 36, all of which also may be stored on hard disk drive 28. Basically, to secure a program, the user first copies the original program 30 into a work area of disk drive 28. The user then invokes the Make Armor module 32, which operates as a stand-alone utility program. Make Armor processes original program 30 in various ways and outputs as a result protected program 38. Protected program 38 is functionally equivalent to original program 30, except that program 38 is coupled to security routines in Run Armor 34 and Armor 36, such that when program 38 is executed, Run Armor 34 will be automatically invoked and will in turn invoke Armor 36.

The three modules Make Armor 32, Run Armor 34, and Armor 36, will now be described in detail.

Make Armor

Figure 3:
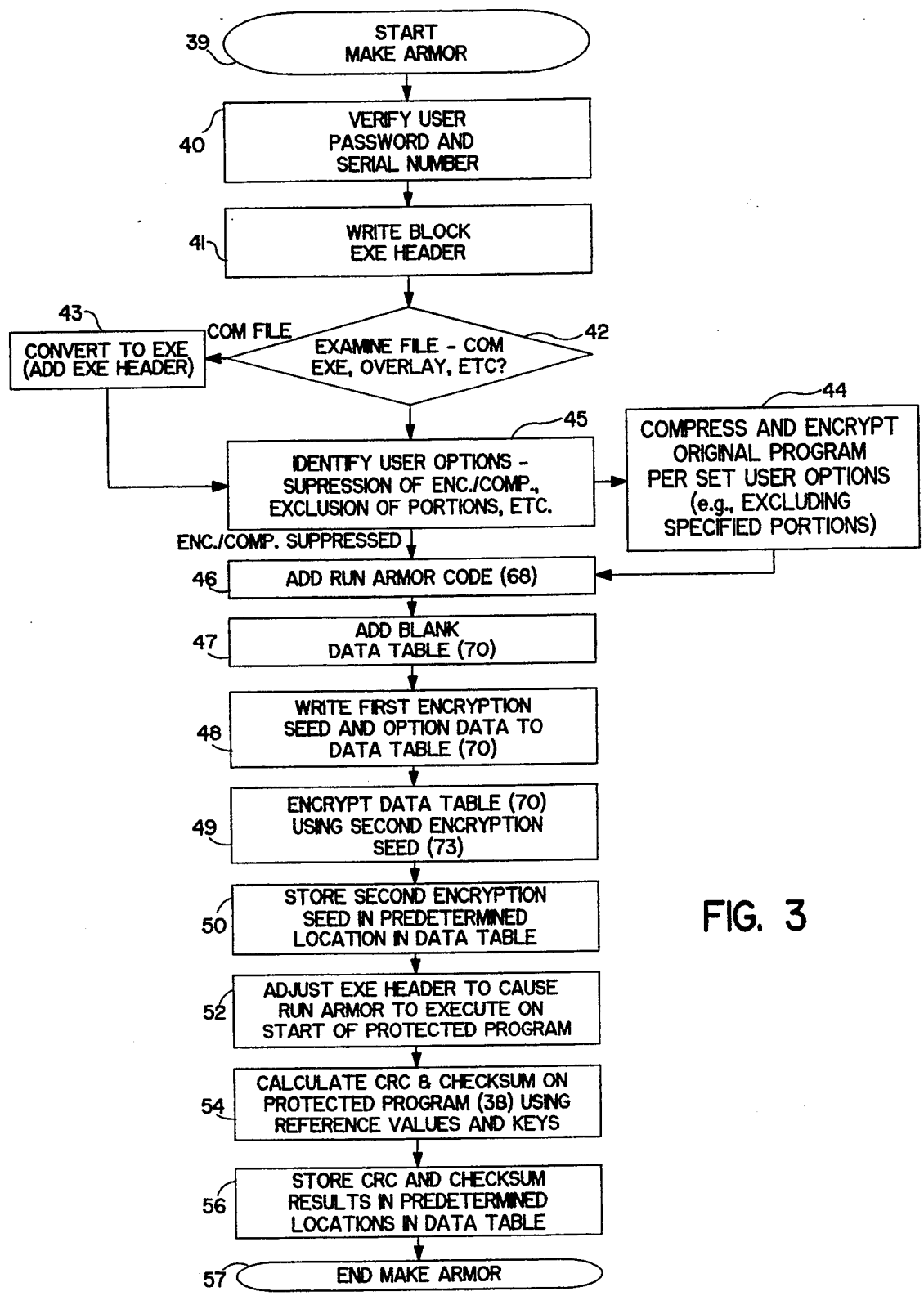
FIG. 3—A diagram of the major logical steps carried out by the Make Armor module.

We refer now to FIG. 3, which outlines the specific steps performed by Make Armor. We shall also refer to FIG. 4 in the following discussion, which depicts the internal structures of original program 30 and protected program 38.

Make Armor 32 is stored on hard disk 28 as an ordinary program on the system 10 depicted in FIG. 1. In block 39, Make Armor 32 is invoked by the user in the ordinary fashion for his or her system (e.g., by entering its name on the command line, by clicking on the appropriate choice with a mouse), and preferably begins by prompting the user to enter a unique serial number and a password, as indicated in block 40. In addition to providing authorization security, the serial number unique to this user also will be imprinted on every program processed by the user's copy of Make Armor along with the date and BIOS identification of the computer being used to produce the hardened program. This creates a permanent record in subsequent copies of protected program 38 that allows the origins of such copies to be traced, and thus may discourage unauthorized tampering with Make Armor 32 or programs protected by Make Armor.

Referring to block 41 (FIG. 3), Make Armor 32 then writes a new EXE load module header 64 (FIG. 4), in standard form, to the output file which will constitute protected program 38 upon completion of Make Armor 32. The layout and data included in a typical EXE file load module header 60 is shown in Table 1 below, and is described more fully in Duncan, Ray, *Advanced MS-DOS Programming*, ISBN 1-55615-157-8, pp. 22–36 (1988), which is incorporated herein by this reference, and in other similar references readily available and familiar to those skilled in the art.

TABLE 1

| Contents of a Typical .EXE Load Module Header | |
|---|---|
| HEX OFFSET | CONTENTS |
| 00–01 | 4DH, 5AH -- This is the Link program's signature to mark the file as a valid .EXE file. |

TABLE 1-continued

Contents of a Typical .EXE Load Module Header

| HEX OFFSET | CONTENTS |
|---|---|
| 02–03 | Length of image mod 512 (remainder after dividing the load module image size by 512). |
| 04–05 | Size of the file in 512-bye increments (pages), including the header. |
| 06–07 | Number of relocation table items. |
| 08–09 | Size of the header in 16-byte increments (paragraphs). This is used to locate the beginning of the load module in the file. |
| 0A–0B | Minimum number of 16-byte paragraphs required above the end of the loaded program. |
| 0C–0D | Maximum number of 16-byte paragraphs required above the end of the loaded program. |
| 0E–0F | Displacement in paragraphs of stack segment within load module. |
| 10–11 | Offset to be in the SP register when the module is given control. |
| 12–13 | Word checksum -- negative sum of all the words in the file, ignoring overflow. |
| 14–15 | Offset to be in the IP register when the module is given control. |
| 16–17 | Displacement in paragraphs of code segment within load module. |
| 18–19 | Displacement in bytes of the first relocation items within the file. |
| 1A–1B | Overlay number (0 for resident part of the program) |

As discussed below, new EXE load module header 64 later will be adjusted to cause the Run Armor code 68 (FIG. 4) to be executed upon any attempt to execute protected program 38.

In the case of the PC-DOS/MS-DOS operating system, executable original program 30 may be either in the form of a COM or an EXE file. A COM file is in the form of a memory image, while an EXE program file has an EXE load module header containing the EXE signature (i.e., the first two bytes are 4 Dh and 5 Ah or "MZ" in ASCII), and information regarding relocation, memory requirements, and other execution details. In block 42, Make Armor 32 examines original program 30 to determine whether it is a COM memory image type file or an EXE file, by looking for the presence of the standard EXE file signature which would identify the file as an EXE file. If original program 30 is determined to be a COM file, Make Armor converts it to an EXE file in block 43 by the addition of an EXE load module header 60 (FIG. 4) in a conventional manner. It should be noted that this is in addition to the new EXE load module header 64, which previously was written to the file comprising protected program 38. Conversion to EXE format removes the 64K-byte file size limitation of COM files that might be exceeded upon the addition of Run Armor code 68 and data table 70 discussed below, and further eliminates the threat from a large number of viruses that will only attack COM program files and not the more complicated EXE files.

Next, as indicated in block 44, Make Armor compresses and encrypts original program 30. As discussed below, such compression or encryption optionally may be suppressed for all or some portions of original program 30 in accordance with user selected options. These user options are identified in block 45 by such means as reading command line switches provided by the user when Make Armor was invoked, prompting the user, or, in the preferred embodiment, by a combination of these methods. The compressed and encrypted code 66 (FIG. 4) is stored in the new file created to contain the protected program 38. Compression reduces the amount of disk space required by the protected program; it also makes the original code generally unrecognizable, and thus less vulnerable to reverse engineering and infection by viruses.

Several well known compression techniques are suitable for the preferred embodiment of this invention, as discussed in references such as Storer, J. A., *Data Compression: Methods and Theory* (Computer Science Press, 1988). Detailed algorithm comparisons have been published in the computer science literature, and, as is apparent to those skilled in the art, the choice of a particular technique involves tradeoffs among speed, compactness, and security. A Ziv-Lempel compression algorithm, as described (for example) in Williams, R., *An Extremely Fast Ziv-Lempel Data Compression Algorithm*, IEEE Data Compression Conference (1991), IEEE Catalog Number 91TH0373-1, pp. 362–371, which is incorporated herein by this reference, is recommended for its optimum speed; however, the selection of alternate methods remains within the scope of the disclosed invention.

Figure 5:
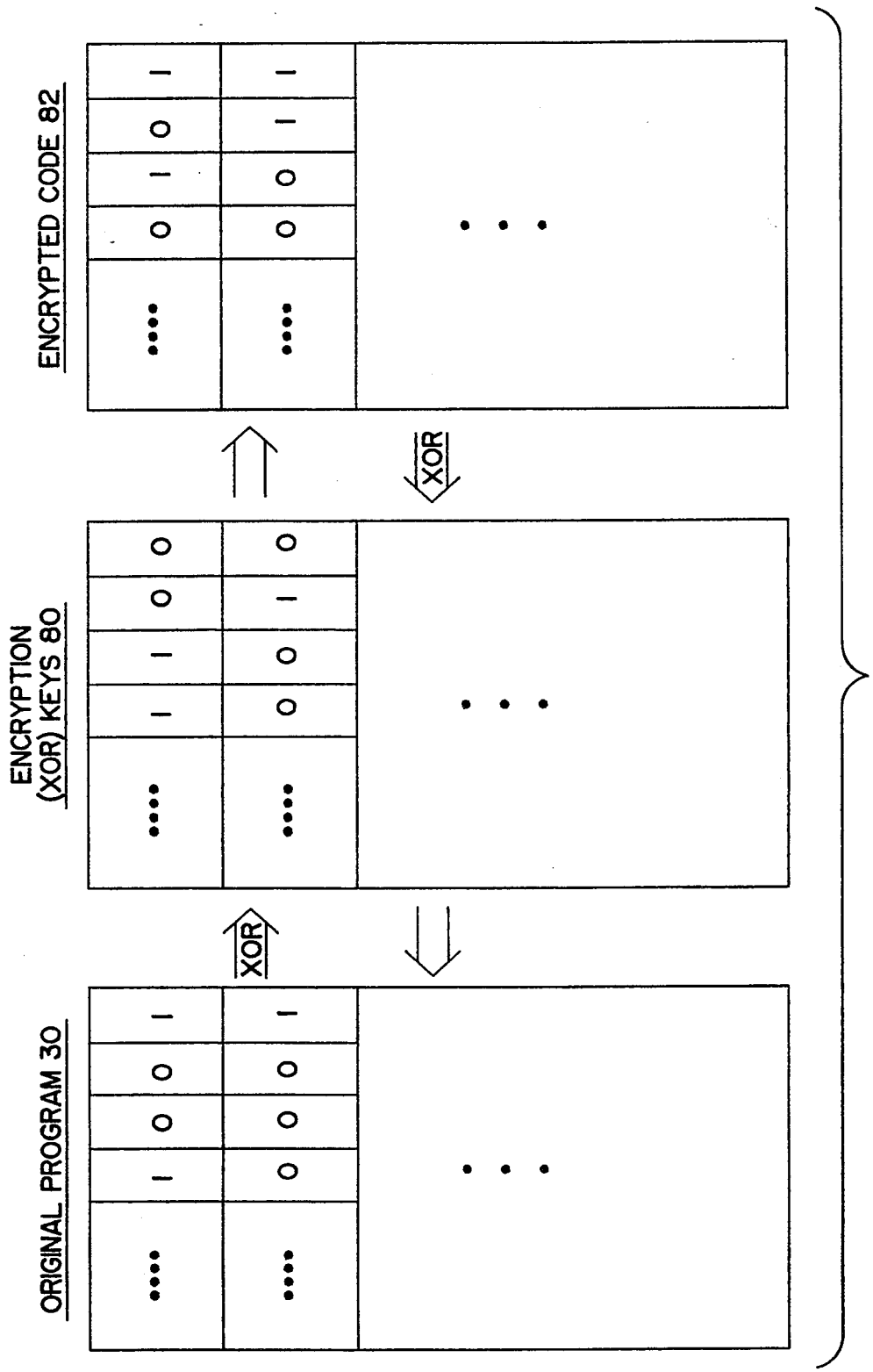
FIG. 5—An illustration of the encryption process according to the preferred embodiment.

As illustrated in FIG. 5, encryption is performed by exclusive-ORing (XORing) each word of the original program 30 with numeric keys 80 to produce encrypted words 82. Preferably, multiple keys are used, such that each word of the program is encrypted with a different key. This process is well known.

A pseudo-random number generator preferably is employed to create the multiple keys 80 used to encrypt the original program. In the preferred embodiment, the pseudo-random number generator is seeded using a random clock count internal to the computer, and produces a series of numbers, used as keys 80. The pseudo-random number generator further must have the property that use of the same seed always results in generation of the same series of keys. Thus, the seed serves as the primary key for encryption and decryption, from which the multiple keys 80 are generated. Preferably, a new seed is used for each original program to be protected, thereby further discouraging unauthorized disassembly and tampering. In addition, the pseudo-random number generator will preferably produce an effectively non-repeating series of keys, i.e. a series in which repetition occurs only after a fairly large number of keys (e.g., on the order of the number of words in original program 30) have been generated from the same seed. Pseudo-random number generators having the forgoing properties are well known in the art. One representative example, suitable for use with the preferred embodiment, is the algorithm referred to as URN13 and described in Dudewicz and Ralley, *The Handbook of Random Number Generation and Testing*, pp. 620–21 (1981), which is incorporated herein by this reference. Said reference provides model Assembler source code for implementing URN13, as shown in Table 2 below:

TABLE 2

| | | Random Number Generator Code |
|---|---|---|
| URN 13 | START 0 | URN 13 (IX,X,NBATCH) |
| | USING *, 15 | USE REGISTER 15 AS BASE REGISTER |
| | STM 14, 12, 12(13) | STORE SAVE AREA |
| | L 14,0(1) | LOAD ADDRESS OF IX INTO REG. 14 |
| | L 6,4(1) | LOAD ADDRESS OF X INTO REG. 6 |
| | L 7,8(1) | LOAD ADDRESS OF NDIMX INTO REG. 7 |
| | L 2,0(6) | LOAD CONTENTS OF X INTO REG. 2 |
| | L 3,0(7) | LOAD CONTENTS OF NDIMX INTO REG. 3 |
| LOOP | L 1,0(14) | LOAD CONTENTS OF IX INTO REG. 1 |
| | M 0,FACTOR | X(I + 1) = A * X(I)MOD(2**32) IN REG. 1 |
| | ST 1,0(14) | IX = X(I + 1) |
| | SLDL 0,24 | SHIFT DBL. REG. 0-1 LEFT BY 24 BITS |
| | STM 0,1,HOLD | STORE DOUBLE PRECISION MANTISSA IN HOLD |
| | MVI HOLD, X'40' | INSERT BIASED EXPONENT (TRUE EXPONENT ZERO) |
| | LD 0,HOLD | LOAD FLT PT REG. 0 WITH HOLD |
| | AD, 0,ZERO | NORMALIZE REG. 0. IT NOW CONTAINS X(I + 1)3 |
| | STE 0,0(6) | STORE INTO X(I) |
| | LA 6,4(6) | INCREMENT INDEX REGISTER |
| | BCT 3,LOOP | BRANCH TO TOP OF LOOP |
| | LM 14, 12, 12(13) | RESTORE SAVE AREA |
| | BR 14 | BRANCH TO RETURN ADDRESS |
| HOLD | DS 1D | HOLD = ONE DOUBLE WORD |
| ZERO | DC D'0.0' | ZERO = DOUBLE PRECISION ZERO |
| FACTOR | DC X'278DDE6D' | THIS HEX FACTOR = 663608941 IN DECIMAL |
| | END | |

Turning again to the steps of compression and encryption referred to in block 44 (FIG. 3), these steps logically can be considered separate, i.e., all of the data from original program 30 can first be compressed in one pass and then encrypted in a second pass. However, this technique is inefficient, especially where, as is often the case, the size of original program 30 is sufficiently large that there is not sufficient room in main memory 22 to contain the entire original program 30 and the code operating on it, thus necessitating multiple disk reads and writes of the same data. Thus, in the preferred embodiment both compression and encryption are performed on the data from original program 30 in a single pass to maximize the speed of the process. To accomplish this, a block of data from original program 30 is read into a buffer (4,096 bytes long in the preferred embodiment) contained in buffer area 29 of main memory 22 (FIG. 1). The data from that buffer is then treated according to the Ziv-Lempel compression algorithm discussed above. Each of the resulting series of compressed words is XORed against a numeric key 80 generated by the pseudo-random number generator described above, thus encrypting the word, and then is written to the file constituting protected program 38. When the buffer is emptied, additional uncompressed and unencrypted data is read from original program 30 and the process is repeated until all data from original program 30 has been compressed and encrypted (other than those portions specifically excluded by user request as identified in block 45 of FIG. 3).

Referring once again to FIGS. 3 and 4, Make Armor next adds the Run Armor code 68 (FIG. 4) to protected program 38, as shown in block 46 (FIG. 3). In the preferred embodiment this is accomplished by appending a copy of the Run Armor code 68 to the end of the file constituting protected program 38, which already contains a new EXE load module header 64, compressed and encrypted program code 66, and possible optional ASCII text label 65 and modifiable data area 67. It is apparent to those skilled in the art, however, that the physical location of the Run Armor code 68 within protected program 38 (or even elsewhere within computer system 10) is immaterial so long as the new EXE load module header 64 is adjusted properly and any necessary instructions are supplied so as to cause the Run Armor code to execute upon any attempt to execute protected program 38.

In block 47 a blank copy of data table 70 (FIG. 4) is appended to protected program 38 following the Run Armor code 68. In the preferred embodiment, the location of the data table immediately following Run Armor code 68 allows Armor 36 (which is later invoked by Run Armor code 68, as discussed below) to locate the data table 70 within a protected program 38 file. This is possible because the Run Armor code 68 has a fixed signature and is not compressed or encrypted, thus enabling Armor 36 to search protected program 38 to locate the end of Run Armor code 68, which marks the beginning of data table 70. Other physical locations for data table 70 within protected program 30 (or elsewhere within computer system 10) are possible, so long as an appropriate marker or other mechanism is provided to enable Armor 36 to locate data table 70.

Referring now to block 48 of FIG. 3, in the preferred embodiment, the random number generator seed used to encrypt the original program code 66 (as described above) is stored in the data table 70 (FIG. 4) at a predetermined first encryption seed location 72, so that the multiple encryption keys 80 may be reproduced later by Armor 36 in order to decrypt the encrypted original program. User option data and other information necessary for Armor 36 to properly verify and reconstruct protected program 38, such as the location of any optional modifiable data area 67, whether compression or encryption has been suppressed, etc., also are written to data table 70 in option data area 78.

As shown in block 49 (FIG. 3), preferably the data table 70 then is itself encrypted, using a second random seed based on the internal clock of the computer system 10 and using the encryption method described earlier. In block 50 this second encryption seed is the stored within the data table 70 (FIG. 4) at a predetermined location 73 that is excluded from the encryption/decryption process. In this way, the Armor module 36 can later access and use the non-encrypted second encryption seed 73 to decrypt the data table 70, and thereby obtain the first encryption seed 72 in order to decrypt the original program code 66.

In block 52 of FIG. 3, the necessary adjustments (as apparent to one skilled in the art) are made to the new EXE load module header 64 so as to cause the Run Armor code 68 to execute upon any attempt to execute protected program 38. Run Armor should preferably be compiled as a COM file, so that it contains no relocation items and so that all of its data code and stack are within the same segment. The EXE header entries described earlier (see Table 1) are set for Run Armor as if the program were a COM file: the number of relocation items (bytes 6 & 7) are set to zero; displacement of the stack segment (bytes 0E & 0F) point to the end of the segment; and the IP segment and offset (bytes 14, 15 & 16, 17) are set to the starting point of Run Armor so that execution of protected program 38 will begin there.

Finally, after all adjustments have been made to protected program 38, Make Armor calculates a reference checksum value and a reference cyclic redundancy check ("CRC") value for the protected program in block 54, and stores them to the data table 70 (FIG. 4) in predetermined locations 74, 75, as shown in block 56 (FIG. 3). A reference checksum value is calculated by summing all of the bytes in the original program. A reference CRC value is calculated by XORing the bytes of the original program with each other, in sequential order. As described further below, the point of computing and saving these reference values is so that the Armor module 36 can verify the integrity of a protected program at execution time by performing the same checksum and CRC calculations on the file containing the program to be executed. If the values computed at execution time differ from the stored reference values, that indicates to Armor that the protected program file has been somehow modified, indicating possible corruption. As is obvious to one skilled in the art, the checksum and CRC results should not themselves be part of the checksum and CRC calculations. Thus, locations 74 and 75 where the reference values are stored must be excluded from the checksum or CRC calculations performed by either Make Armor or Armor.

In the preferred embodiment, a number of variant methods are used to calculate the checksum and CRC reference values. For example, one or more keys (created using random number generation means as described earlier) may be added to the reference checksum value; one or more such keys may be inserted at the beginning of the XOR sequence; and one or more such keys may be used to determine the number of positions that each byte from the original program should be rotated before it is used in the checksum or CRC calculation. The specific choice of variants utilized is immaterial; the important point is that by employing a plurality of different checksum and CRC calculation methods, the possibility of undetected tampering is minimized. In any case, during the steps shown in block 56 (FIG. 3), any such additional keys also are stored in the data table 70 at predetermined locations 76 and 77 so that they may be recovered and used later by Armor module 36.

Because the CRC and checksum references values and keys, 74, 75, 76 and 77, are written after the encryption of data table 70 has been completed in block 49, these elements are not stored in encrypted form and thus should be exempted from the decryption of the data table by Armor 36.

Not every original program 30 is suitable for the compression and encryption step 44 described earlier, as will be apparent to those skilled in the art. For example, programs that use internal overlays or do their own loading and relocation may not function properly when compressed and then decompressed. Therefore, Make Armor preferably allows the user to request that the step of encryption and compression step 44 be suppressed, as indicated in block 45 of FIG. 3. In that case, in all other respects Make Armor would follow the method as described above. Examination of original program 30 for the presence of overlays or similar factors making compression and encryption undesirable may preferably be employed by Make Armor, as in block 42 of FIG. 3, so that Make Armor can assist the user in recognizing when and where compression and encryption need to be suppressed.

Figure 4:
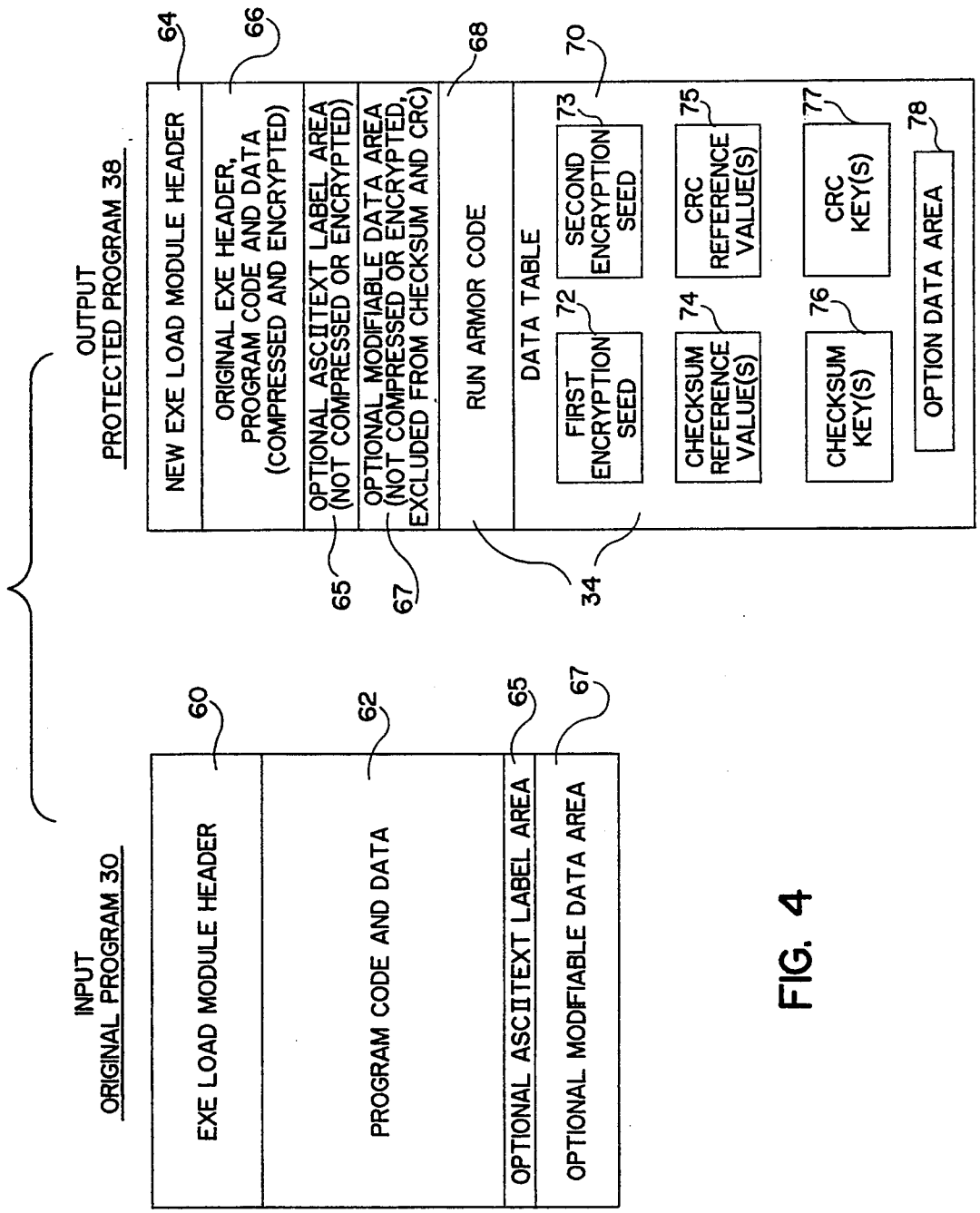
FIG. 4—A diagram showing certain internal structures of a target program, and a protected version of that program.

Further, as will be understood by those skilled in the art, certain portions of an original program 30 preferably should not be compressed or encrypted. For example, some original programs contain an ASCII text label 65, as shown in FIG. 4, intended as a message to anyone examining the program with an editor or viewer, which may describe the origin of the program or applicable copyright or patent notices. Since the encrypted portion 66 of protected program 38 is unreadable, it is desirable not to compress or encrypt the ASCII text label 65. Accordingly, in block 45 of FIG. 3 Make Armor further identifies any user specified segments or locations within the original program 30 that should be excluded from compression and encryption.

In addition, some original programs 30 contain a modifiable data area 67 (FIG. 4), which the original program uses as a "scratch pad" in which to record installation or other information for later use at execution time. In order that normal edits of this modifiable data area 67 performed by the protected program not trigger any false checksum or CRC alarms, the modifiable data area 67 should not be included in the compression, encryption or checksum calculations. Again, Make Armor in block 45 (FIG. 3) identifies any specific segments or locations within the original program 30 designated by the user as constituting a modifiable data area 67 that should be excluded from compression and encryption and also from checksum and CRC calculations.

As discussed above, information concerning whether encryption and compression have been suppressed, the location and size of any ASCII text label area 65 or modifiable data area 67 are stored in data table 70 within option data area 78, which is read by Armor 36 in order to properly verify and reconstruct protected program 38.

Upon completion of the foregoing operations creation of protected program 38 is complete, Make Armor terminates at block 57 (FIG. 3), and control is returned to the operating system. Once protected program 38 has been created, Make Armor 32 need no longer be present on hard disk 28 or elsewhere within system 10 in order to execute protected program 38; all that is required is a functional copy of Armor 36 (Run Armor module 34 now being embodied within protected program 38). Indeed, in order to help prevent unauthorized tampering, it is recommended that Make Armor be removed from system 10 when not being used or, alternatively, that protected program 38 be distributed without an accompanying copy of Make Armor 32.

Note that Make Armor module 32 itself can and preferably should be protected using the methods of this invention. If necessary, as where no original copy has been kept, the original program 30 can be restored by following the decryption and decompression steps outlined in the discussion below of the Armor 36 module, with the resulting restored program being written to disk along with an appropriate EXE load header.

Run Armor

To run protected program 38, the user enters the program name, or uses an appropriate "mouse" command, etc., as normal. As described above, the protected program has been created by Make Armor such that the new EXE load module header 64 causes the Run Armor code 68 (a portion of Run Armor module 34) automatically to be invoked upon attempted execution of the protected program 38 and to commence execution at block-89, depicted on FIG. 6.

Figure 6:
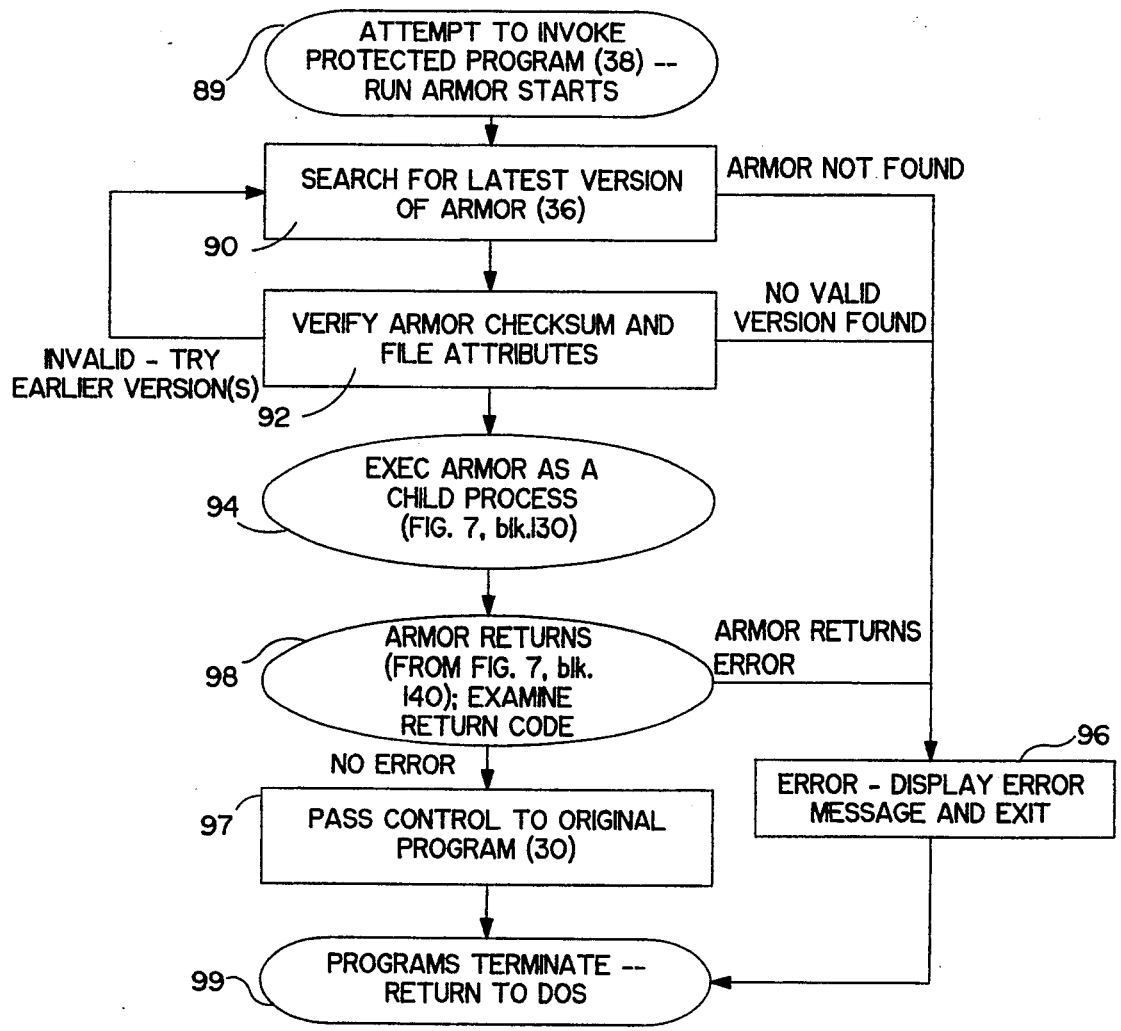
FIG. 6—A diagram of the major logical steps carried out by the Run Armor module.

Referring now to FIG. 6, in block 90 Run Armor first searches hard disk 28 for the latest version of the Armor 36 program, as determined from data and time stamps or version codes (e.g., ARMOR001.EXE, ARMOR00-2.EXE, etc.). For the sake of efficiency, this search preferably is limited to the directories contained in the user's predefined search path. By utilizing the latest available version of Armor 36, a protected program 38 can take advantage of new, updated versions of Armor 36 as they are released. New viruses and their signatures can be included in such updated Armor modules, so the protected program need not be replaced or modified to enjoy updated protection.

Having found the latest available version of Armor, in block 92 Run Armor 34 briefly examines the file containing Armor, inspecting the file attributes, date and time stamps, file size, and the contents of one or more predetermined bytes, to verify that these data match the characteristics of an authentic Armor program. If necessary, Run Armor will repeat this process with less recent versions of Armor, until an acceptable version of Armor is found. If no such version can be found, the process is halted and an error message is displayed as indicated in block 96. If an acceptable version of Armor 36 is found, Run Armor 34 executes Armor 36 by calling Armor 36 as a child program in block 94. Armor 36 performs various security and related measures and then returns to control to Run Armor 34, as is described in detail below,

Armor

Armor 36 comprises specified security routines which serve to verify the integrity of protected program 38 at execution time, by checking for the presence of corruption within protected program 38 and also within certain portions of computer system 10. Many such security routines are well known in the art, and those skilled in the art will understand that the specified security routines to be used in Armor 36 may comprise such existing prior art security routines (with or without adaptations), new security routines written for this purpose, or any combination of the foregoing. In any case, the preferred operation of the security routines is set forth below.

Figure 7:
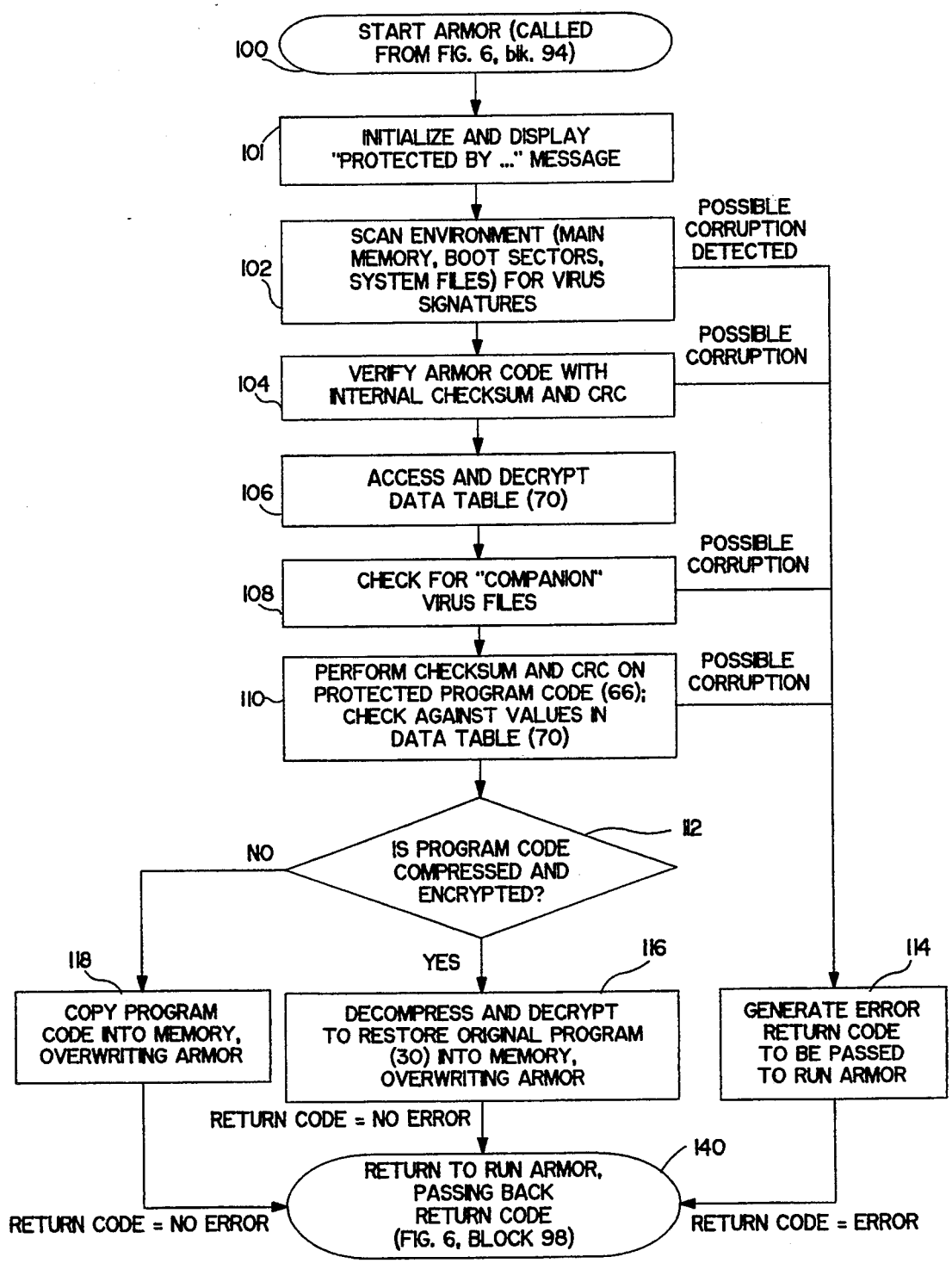
FIG. 7—A diagram of the major logical steps carried out by the Armor module.

Referring now to FIGS. 4 and 7, execution of Armor begins at block 100. In block 101, Armor preferably displays a "Protected by . . . " or comparable sign-on message, to assure the user that protective measures are being performed. Note that programs to be protected will sometimes comprise a main program and several auxiliary programs that are executed as children of the main program. If the main program and its children are each hardened, it might be desirable for only the main program to display the initial sign-on message. Preferably, Make Armor 32 allows users to select the option that the sign-on on message be suppressed if the protected program 38 is being executed as the child of another protected program. This may be accomplished in any of a number of ways, including by having the first protected overlay set a flag so that the message will be suppressed when subsequent overlays trigger Armor, by passing a command line option to suppress the message, or, in the preferred embodiment, by using both such techniques in combination.

After sign-on message display, Armor 36 performs various integrity tests. In more detail, in block 102 Armor first scans for the presence of any known virus signatures. These signatures are a sequential portion of code, typically up to 16 bytes in length, unique to each virus. Those of skill in the art are familiar with the signatures of many known viruses, and lists of such viruses (and their signatures) are often published, as in Virus Bulletin Ltd., ISSN 0956-9979, Oxon, U.K. (July 1991), which is updated periodically.

Figure 8:
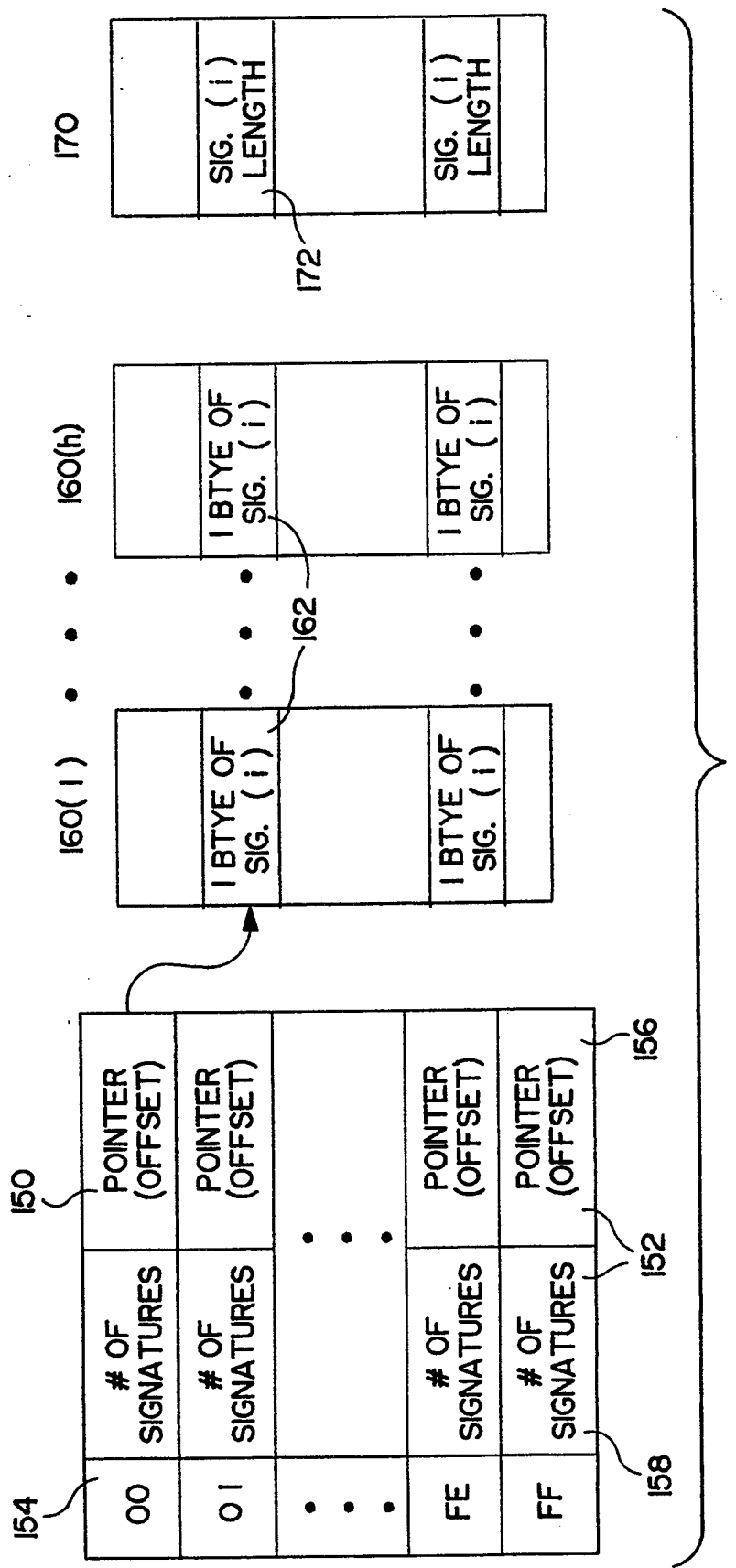
FIG. 8—A diagram of tables for storing virus signatures.

To facilitate an efficient signature scan function, and to prevent the stored virus signatures themselves from causing false alarms, the signatures are stored in a series of tables, as illustrated in FIG. 8. Each signature element 162 in signature tables 160(1) through 160(n) contains the value of one byte of one virus signature: that is, the $i_{th}$ element in signature table 160(1) contains the second byte in the $i_{th}$ virus signature, the $i_{th}$ element of signature table 160(2) contains the third byte in the $i_{th}$ virus signature, and so on, through signature table 160(n). Thus, the number of signature tables 160 provided should equal the length of the longest virus signature to be scanned for minus one, and the number of signature elements 162 in each signature table 160 should equal the number of virus signatures to be scanned for. Further, the signature elements 162 in the signature tables 160 should be sorted to according to the ascending numerical order of the corresponding virus signatures.

In order to gain access to the signature tables 160, an index table 150 preferably is used. Each index element 152 of index table 150 corresponds to each possible byte value 154 for the first byte of a virus signature; the table 150 should therefore have room for 256 elements, which is the number of different values possible for one byte of data. The index elements 152 should be sorted in the ascending order of the corresponding byte values 154. Each index element 152 contains two fields: signature count field 158, which contains the number of virus signatures that begin with the corresponding byte value 154, and an pointer field 156, which specifies (index i) the location in subsequent tables 160(1) through 160(n) where the elements corresponding to signatures beginning with byte value 154 are stored.

The foregoing data structure facilitates an efficient signature scan procedure. When memory is scanned, the first memory byte examined is used as an index to specify an index element 152 in index table 150. If signature count field 158 indicates that no signatures begin with this byte, the scan process is restarted for the next byte in memory. If signature count field 158 in the specified index element 152 indicates that one or more virus signatures do begin with the byte being examined, then the relevant signature elements 162, stored in signature tables 160(1) though 160(n), as determined from pointer field 156, are compared to successive bytes in memory, until either a complete virus signature match is found, or until the memory being examined is fully scanned. For purposes of knowing when a signature match is "complete," an extra signature length table 170 is preferably provided, wherein the $i_{th}$ length element 172 of signature length table 170 contains the length of the virus signature corresponding to the $i_{th}$ elements of the tables 160.

For purposes of efficiency, and depending on the particular computing environment in use, it may be preferable to slightly modify the above data structure, such that each signature element 162 in certain of the signature tables 160 contains two or more bytes of a corresponding virus signature, so that the number of separate comparison operations necessary in the scanning procedure will tend to be reduced, as where the particular processor supports efficient word or multi-word comparison functions. Such opportunities for fine-tuning or optimization will be apparent to those skilled in the art, and are within the scope of the disclosed invention.

Main memory 22 (which may include any extended, expanded or other additional RAM memory included within computer system 10) preferably is scanned first because there are a number of "stealth" viruses that avoid detection by hiding in memory before a program is run. Preferably, system files (such as COMMAND.COM) are also searched, as are boot strap loader records, including those on any floppy disks in place. If desired, scanning of system files and boot records can be skipped to improve speed, but at some loss in security.

Referring now to block 104 of FIG. 7, Armor preferably verifies the integrity of its own code by computing checksum and CRC values (as described earlier regarding Make Armor), and comparing them to reference values that are stored within Armor at the time of its creation. Next, in block 106 Armor accesses and decrypts the data table 70 stored within protected program 38, which contains checksum, CRC and decryption information for the protected program.

In addition, as shown in block 108, the hard disk drive 28 preferably is examined for the presence of any so-called "companion" viruses. These are viruses that take advantage of the ability of certain operating systems to run files with the same name, but different extensions. For example, if an application program exists in a file named "WORD EXE" a companion virus might secretly be placed in a file named "WORD.COM". Thus, if the "WORD.EXE" file is examined, it will not reveal any viruses or other modification, but if a user attempts to run the "WORD" program, the operating system will first run the "WORD.COM" file thereby unleashing the companion virus, and only afterwards will "WORD.EXE" be run. To avoid this problem, Armor can ensure that no file having the same name as the protected program but with a different executable extension ("COM" instead of "EXE", for example) is present. In the preferred embodiment, this feature may be turned off as a user option during processing of the original program by Make Armor 32, in which case information indicating this fact is stored in the option data area 78 of data table 70.

In block 110, the protected program 38 is read as it appears on disk, and its integrity is confirmed by computing checksum and CRC values and comparing those values to the reference values 74, 75 stored in the data table 70 by Make Armor and described earlier. In block 112 Armor determines from the option data area 78 of data table 70 whether the code corresponding to the original program 66 is compressed and encrypted. If it is not compressed and encrypted, code 66 is read from the disk 28 and, as indicated in block 118, loaded into the portion of memory previously occupied by all but a small portion of Armor. If code 66 was compressed and encrypted, it is read from the disk 28 and decompressed and decrypted in block 116, and loaded into the portion of memory previously occupied by Armor. To decrypt the code, Armor takes the first encryption seed 72 value contained in the data table 70 and runs the same pseudo-random number generation method used by Make Armor, to recover the original encryption keys. Armor can then decrypt the code by simply XORing the encrypted code 66 with the same keys 80, which will undo the encryption, as can be seen in FIG. 5.

Finally, in block 140 Armor returns control to Run Armor, passing back a return code indicating that no corruption was detected and no errors occurred. If corruption or errors were detected, in block 114 the return code is set to indicate the general nature of the error or corruption and is passed back to Run Armor.

Referring once again to FIG. 6 at block 98, when control returns to Run Armor the return code returned by Armor is examined to determine whether execution may continue. If no errors or corruption are indicated, control is transferred at block 97 to the normal beginning of program code 66 that is now back in the state of original program 30. Execution proceeds as it would have for original program 30. On most computers available today, the entire security process carried out by Run Armor and Armor happens within a few seconds, just enough time for users to read the sign-on message.

If the return code returned by Armor indicates possible corruption or errors, control is passed to block 96 which sounds an alarm, displays an appropriate warning on video monitor 26, and causes execution of the protected program to be terminated at block 96, thus preventing the contamination from spreading unnoticed. Additionally, a red border preferably is left around the perimeter of video display monitor 26, further highlighting the problem and reminding the user to take immediate steps to address the possible infection.

As will be apparent to those skilled in the art, embodiments of the invention are possible as alternatives to implementing Armor as a child program invoked by Run Armor. For example, Armor might be implemented as a software interrupt invoked by Run Armor, as a BIOS level routine requested by Run Armor, or as an external subroutine called by Run Armor and linked to the protected program using a conventional linker. In this and other respects, the preceding description is intended only by way of example, and the invention is not limited thereto. Those skilled in the art will recognize that a number of improvements and modifications can be made to the invention without departure from its essential spirit and scope.

What is claimed is:

1. A method of using a computer system to secure against corruption by virus an existing executable software program, said computer system having one or more storage media, said existing executable software program being stored on at least one of said storage media, said method comprising the steps of:

identifying one or more security routines, said one or more security routines to detect corruption by virus of said existing executable software program and to detect the presence of corruption by virus of portions of said computer system external to said existing executable software program;

modifying electronic signals representative of said existing executable software program to cause said computer system to execute said one or more security routines first during each execution of said existing routines to said software program; and storing said modifications to said existing executable software program.

2. The method of claim 1 further including the step of storing said one or more security routines to at least one of said storage media.

3. The method of claim 1, wherein said modifying step further includes the step of modifying electronic signals representative of loading information associated with said existing executable software program.

4. The method of claim 3, wherein said loading information is stored contiguously with said existing executable software program.

5. The method of claim 3, wherein said loading information is stored separately from said existing executable software program.

6. The method of claim 1, wherein said storage media comprise one or more memories and at least one of said one or more security routines scans for the presence of corruption by virus in said one or more memories.

7. The method of claim 1, wherein said storage media comprise one or more mass storage devices and at least one of said one or more security routines scans for the presence of corruption by virus on said one or more mass storage devices.

8. The method of claim 1, wherein at least one of said one or more security routines computes and verifies one or more checksum test values for said existing executable software program.

9. The method of claim 1, wherein at least one of said one or more security routines computes and verifies one or more cyclic redundancy check test values for said existing executable software program.

10. The method of claim 1, wherein said modifying step further includes the step of encrypting said existing executable software program.

11. The method of claim 10, wherein at least one of said one or more security routines decrypts said existing executable software program.

12. The method of claim 1, wherein said modifying step further includes the step of compressing said existing executable software program.

13. The method of claim 12, wherein at least one of said one or more security routines decompresses said existing executable software program.

14. The method of claim 1, wherein at least one of said one or more security routines warns an operator of said computer system when any corruption by virus is detected by said one or more security routines.

15. The method of claim 1, wherein at least one of said one or more security routines aborts the execution of said existing executable software program when any corruption by virus is detected by said one or more security routines.

16. An apparatus for securing against corruption by virus an existing executable software program, said apparatus comprising:

a computer system comprising one or more storage media, said existing executable software program stored on at least one of said storage media;

means for identifying one or more security routines, said one or more security routines to detect corruption by virus of said existing executable software program and to detect corruption by virus of portions of said computer system external to said existing executable software program;

means for modifying electronic signals representative of said existing executable software program to cause said computer system to execute said one or more security routines first during each execution of said existing executable software program; and means for storing said modifications to said existing executable software program.

17. The apparatus of claim 16 further comprising a means for storing said one or more security routines to at least one of said storage media.

18. The apparatus of claim 16, wherein said modifying means further includes means for modifying electronic signals representative of loading information associated with said existing executable software program.

19. The apparatus of claim 18, wherein said loading information is stored contiguously with said existing executable software program on at least one of said storage media.

20. The apparatus of claim 18, wherein said loading information is stored on at least one of said storage media and separately from said existing executable software program.

21. The apparatus of claim 16, wherein said storage media comprise one or more memories and at least one of said one or more security routines scans for the presence of corruption by virus in said one or more memories.

22. The apparatus of claim 16, wherein said media comprise one or more mass storage devices and at least one of said one or more security routines scans for the presence of corruption by virus on said one or more mass storage devices.

23. The apparatus of claim 16, wherein at least one of said one or more security routines computes and verifies one or more checksum test values for said existing executable software program.

24. The apparatus of claim 16, wherein at least one of said one or more security routines computes and verifies one or more cyclic redundancy check test values for said existing executable software program.

25. The apparatus of claim 16, said modifying means further including a means for encrypting said existing executable software program.

26. The apparatus of claim 25, wherein at least one of said one or more security routines decrypts said existing executable software program.

27. The apparatus of claim 16, said modifying means further including a means for compressing said existing executable software program.

28. The apparatus of claim 27, wherein at least one of said one or more security routines decompresses said software program.

29. The apparatus of claim 16, wherein at least one of said one or more security routines warns an operator of said computer system when any corruption by virus is detected by said one or more security routines.

30. The apparatus of claim 16, wherein at least one of said one or more security routines aborts the execution of said existing executable software program when any corruption by virus is detected by said one or more security routines.

* * * * *